US012506631B2

(12) United States Patent
Belling

(10) Patent No.: US 12,506,631 B2
(45) Date of Patent: Dec. 23, 2025

(54) SEPARATE SESSION START REQUEST INDICATION

(71) Applicant: Nokia Technologies Oy, Espoo (FI)

(72) Inventor: Thomas Belling, Munich (DE)

(73) Assignee: Nokia Technologies Oy, Espoo (FI)

( * ) Notice: Subject to any disclaimer, the term of this patent is extended or adjusted under 35 U.S.C. 154(b) by 202 days.

(21) Appl. No.: 18/252,350

(22) PCT Filed: Nov. 8, 2021

(86) PCT No.: PCT/EP2021/080964
§ 371 (c)(1),
(2) Date: May 9, 2023

(87) PCT Pub. No.: WO2022/096720
PCT Pub. Date: May 12, 2022

(65) Prior Publication Data
US 2024/0015044 A1  Jan. 11, 2024

Related U.S. Application Data

(60) Provisional application No. 63/111,271, filed on Nov. 9, 2020.

(51) Int. Cl.
H04L 12/18 (2006.01)
(52) U.S. Cl.
CPC .......... H04L 12/189 (2013.01); H04L 12/185 (2013.01)
(58) Field of Classification Search
CPC ..................................... H04L 12/189
USPC ........................................ 370/312
See application file for complete search history.

(56) References Cited

U.S. PATENT DOCUMENTS

| | | | |
|---|---|---|---|
| 2016/0150590 A1* | 5/2016 | Pocha | H04L 12/185 370/329 |
| 2017/0078371 A1 | 3/2017 | Kodaypak | |
| 2020/0092923 A1* | 3/2020 | Abraham | H04W 4/06 |
| 2020/0344576 A1 | 10/2020 | Li et al. | |

OTHER PUBLICATIONS

"3rd Generation Partnership Project; Technical Specification Group Services and System Aspects; System architecture for the 5G System (5GS); Stage 2 (Release 16)", 3GPP TS 23.501, V16.6.0, Sep. 2020, pp. 1-447.
International Search Report and Written Opinion received for corresponding Patent Cooperation Treaty Application No. PCT/EP2021/080964, dated Feb. 21, 2022, 13 pages.
"3rd Generation Partnership Project; Technical Specification Group Services and System Aspects; Study on architectural enhancements for 5G multicast-broadcast services (Release 17)", 3GPP TR 23.757, V0.3.0, Jan. 2020, pp. 1-37.

* cited by examiner

Primary Examiner — Sibte H Bukhari
(74) Attorney, Agent, or Firm — Barta Jones, PLLC

(57) ABSTRACT

Systems, methods, and/or apparatuses are provided relating to multicast service session information. Related procedures are for example provided including transmitting multicast service session information to a core network node, wherein the multicast service session information comprises an indication of whether a separate session start request will be later provided for the multicast service session and/or a start time and stop time for the multicast service session.

12 Claims, 5 Drawing Sheets

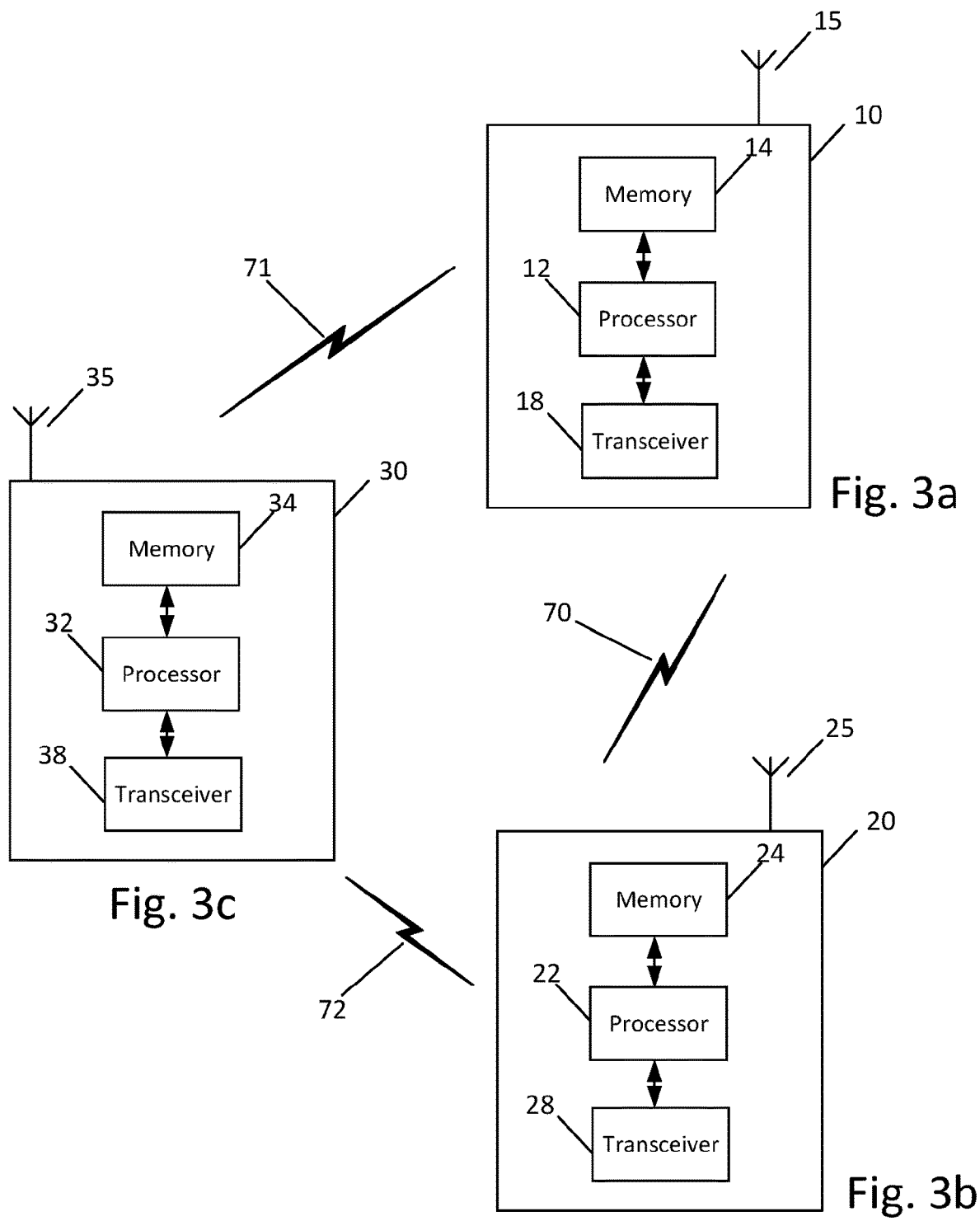

SEPARATE SESSION START REQUEST INDICATION

RELATED APPLICATION

This application is a national stage application, filed under 35 U.S.C. § 371, of International Patent Application No. PCT/EP2021/080964, filed on Nov. 8, 2021, which claims the benefit of and priority to U.S. Provisional Patent Application No. 63/111,271, filed on Nov. 9, 2020, both of which are incorporated by reference herein in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for indicating whether separate session start request is used.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

BRIEF DESCRIPTION OF THE DRAWINGS

For proper understanding of example embodiments, reference should be made to the accompanying drawings, wherein:

FIG. 3a illustrates an example block diagram of an apparatus, according to an embodiment;

FIG. 3b illustrates an example block diagram of an apparatus, according to an embodiment; and FIG. 3c illustrates an example block diagram of an apparatus, according to an embodiment.

DETAILED DESCRIPTION

Figure 1:
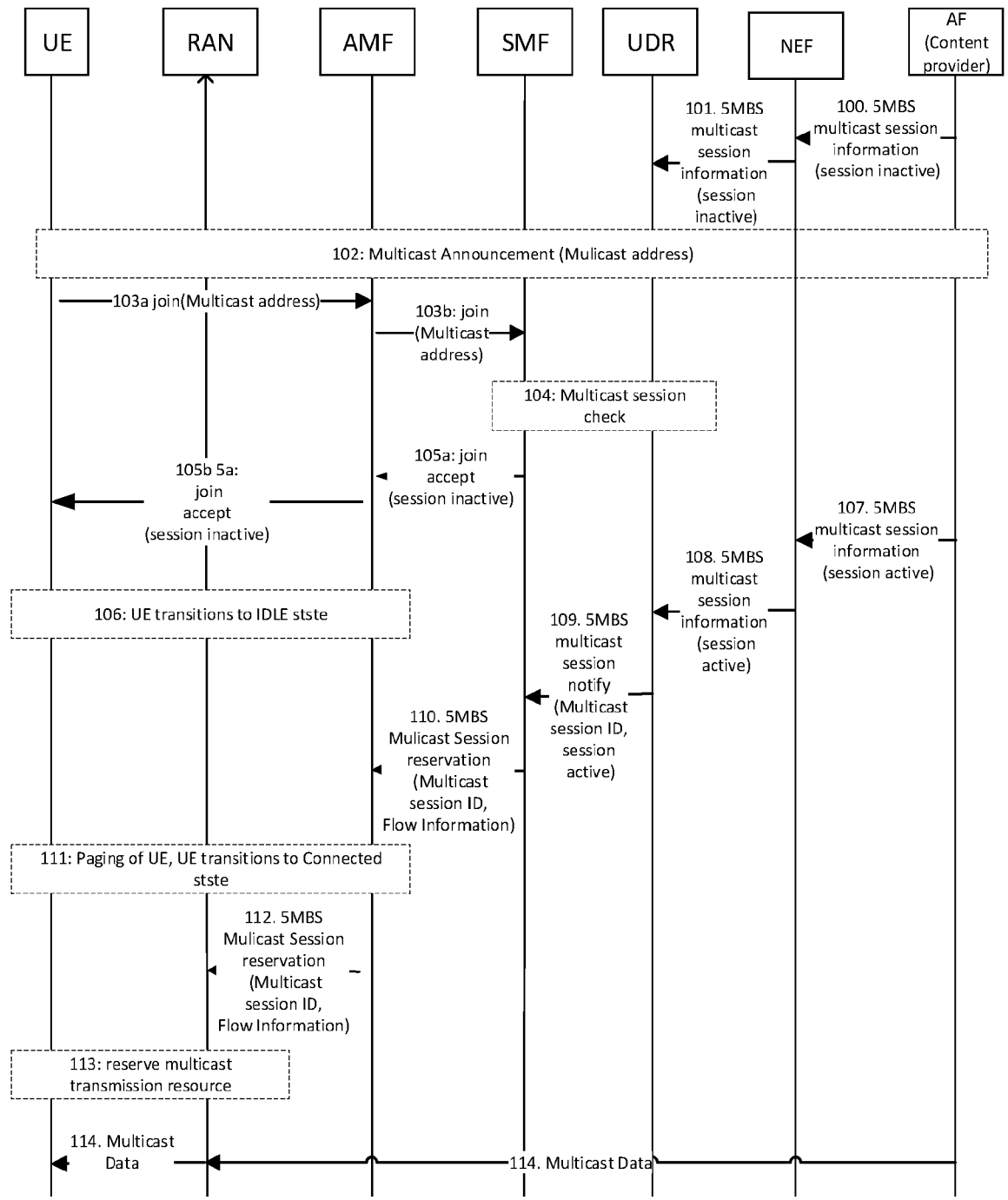
FIG. 1 illustrates an example signaling flow diagram, according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for indicating separate session start request, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Enhancements for 5G multicast-broadcast (5MBS) services are being considered. As will be discussed in detail below, some example embodiments may enable an application function (AF) providing a broadcast/multicast session to directly start the session (i.e., to contact the 3GPP network when a session becomes active and directly request reservation of resources etc.), and to also be able to already "plan" a session in advance (i.e., to indicate to the network that a session will be active sometime in the future so that the network can "prepare" for the upcoming session).

As part of the multicast procedures, a UE indicates its desire to join a multicast session. Some proposals include that, when an AF provides information about a multicast session to the mobile network, resources for a multicast session transmission are reserved. Other proposals include that an AF can configure information about the multicast session in advance, then announce the multicast session to UEs, allowing the UEs to join the multicast session from that point onwards, and finally request the start of the multicast session.

It may depend on the use case as to whether an in-advance service announcement should be used or whether UEs can only be informed when a multicast is started, and transmission resources are immediately reserved when an AF provides information about a multicast session to the mobile network. As just one example, for instance, a TV-like service may desire to announce transmission of a specific film well in advance, or may use constantly transmitting channels to transmit a consecution or sequence of films.

A mobile core network may store information whether a multicast session is active for data transmission as part of the context information for the multicast session. According to an example embodiment, when an AF provides multicast service session information to the core network, the AF may also include an indication whether the AF will (later) provide a separate session start request for the multicast session. If this indication is contained in the multicast session information, the core network knows that the session is not yet active but that it will become active at a later point in time. In an embodiment, the network may store this information about the session becoming later active in a database (e.g., in UDR).

For example, if an AF provides multicast service information together with an indication that it will provide a separate session start request to the network exposure function (NEF), the information that the multicast session is not yet active may be stored by the NEF in a database, e.g., the UDR. When the AF then sends a session start request, the information that the multicast session is started is stored in the database.

In a further example embodiment, the AF may directly, with the multicast session information (and the indication that the session will become active at a later stage), send a session start and stop time. According to an embodiment, the network may also store this kind of information and may then be enabled to automatically determine when a session becomes active. In a further embodiment, the network may have the session start and stop time as configured information and the stored information in the database of whether a multicast session is already started may be updated based on timer supervision.

A UE may request, from a core network, to join a multicast session. In an embodiment, when the core network receives the join request from the UE, the core network node handling the join request (e.g., AMF and/or SMF) may check the stored information about the multicast session the UE wants to join to determine whether the multicast session is active. When it is determined that the respective session is not yet active, the core network node may still decide to accept the join request while the multicast session is not active. According to some embodiments, the response to the join request may include an indication that the multicast session is not yet active, and the core network does not yet request the RAN node handling the UE to reserve transition resources.

In an embodiment, if the UE receives a reply to the join request indicating that the multicast session is not yet active, the UE may transition to the IDLE state. However, if the UE receives a reply to the join request indicating that the multicast session is active, it may remain in connected or inactive states.

According to certain embodiments, if the network node becomes aware or determines that the multicast session becomes active, the network node may request resource reservation for the multicast session from the RAN node that handles the UE. The RAN node may then reserve resources for the multicast transmission. If the UE is IDLE state, then the network node may initiate paging of the UE. The RAN node can then inform the UE about the corresponding radio resources.

In some embodiments, if the multicast session is active when the core network node receives the join request and the network decides to accept the join request, the core network node may request the RAN node handling the UE to reserve resources for the multicast session. The RAN node may then reserve resources for the multicast transmission and may inform the UE about the corresponding radio resources.

FIG. 1 illustrates an example signaling diagram, according to an example embodiment. As illustrated in the example of FIG. 1, at 100, an AF may transmit 5MBS multicast session information to the core network, e.g., to a NEF. In an embodiment, the AF may include, with the multicast session information, an indication whether the AF will (later) provide a separate session start request for the multicast session. When this indication is contained in the multicast session information, the core network (NEF in this example) is made aware that the session is not yet active, but will become active at a later point in time. In an embodiment, as illustrated at 101, the core network or NEF may store this information about the session becoming later active in a database, e.g., in UDR.

In a further example embodiment, the AF may transmit at 100, with the multicast session information and the indication that the session will become active at a later stage, a session start and stop time. According to an embodiment, the core network node, e.g., NEF, may also store at 101 the session start and stop time information and may then be enabled to automatically determine when a session becomes active. In a further embodiment, the network node (NEF) may have the session start and stop time as configured information and the stored information in the database (UDR) whether a multicast session is already started may be updated based on timer supervision.

As also illustrated in the example of FIG. 1, at 102, a multicast announcement including a multicast address may be made. At 103a and 103b, a UE may request, from a core network node, such as an AMF or SMF, to join a multicast session. In an embodiment, when the core network receives the join request from the UE, the core network node handling the join request (e.g., AMF and/or SMF) may, at 104, check the stored information about the multicast session the UE wants to join to determine whether the multicast session is active. When it is determined that the respective session is not yet active, the core network node (e.g., AMF and/or SMF) may still decide to accept the join request even while the multicast session is not active. As illustrated in the example of FIGS. 1, at 105a and 105b, the core network node (e.g., AMF and/or SMF) may transmit a join accept message response. In an embodiment, the response to the join request 105a/105b may include an indication that the multicast session is not yet active, and the core network does not yet request the RAN node handling the UE to reserve transition resources.

In an embodiment, when the UE receives a reply to the join request indicating that the multicast session is not yet active, at 106, the UE may transition to the IDLE state. However, if the UE receives a reply to the join request indicating that the multicast session is active, it may remain in connected or inactive states.

As further illustrated in the example of FIG. 1, when the session becomes active, at 107, the AF may send a 5MBS multicast session information to a core network node (e.g., NEF) and, at 108, the session information may be stored in the UDR. At 109, a network node, such as the SMF, may receive a notification that the multicast session has become active. Then, at 110, when the network node (e.g., SMF) becomes aware or determines that the multicast session has become active, the network node may request resource reservation for the multicast session from the RAN node that handles the UE. If the UE is IDLE state, then the network node (or AMF) may initiate, at 111, paging of the UE and the UE transitions to the connected state. The RAN node handling the UE may, at 112, receive a request to reserve resources for the multicast session. At 113, the RAN node may reserve resources for the multicast transmission and inform the UE about the corresponding radio resources for the multicast session. As also illustrated in the example of FIG. 1, at 114, the AF (as content provider) may transmit and the UE may receive multicast data.

Figure 2A:
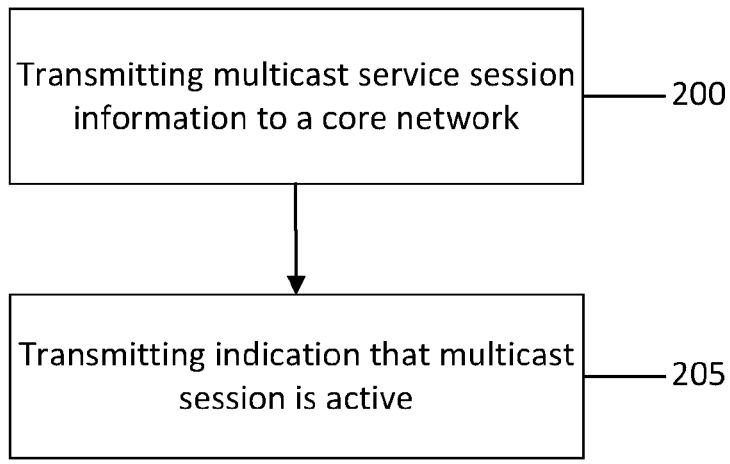
FIG. 2a illustrates an example flow diagram of a method, according to an embodiment.

FIG. 2a illustrates an example flow chart of a method for indicating separate session start request, according to an embodiment. In certain example embodiments, the flow diagram of FIG. 2a may be performed by a network entity or network node in a communications system, such as LTE or 5G NR. In some example embodiments, the network entity performing the method of FIG. 2a may include a base station, access node, node B, eNB, gNB, NG RAN node, or the like. For instance, in one example embodiment, the method of FIG. 2a may be performed by an AF, such as the AF (content provider) depicted in the example diagram of FIG. 1.

As illustrated in the example of FIG. 2a, at 200, transmitting multicast service session information to a core network node, such as a NEF. In an embodiment, the multicast service session information may include or contain an indication of whether a separate session start request will be later provided for the multicast service session. According to one example embodiment, the multicast service session information may also include or contain a start time and stop time for the multicast service session. In certain embodiments, when the multicast service session becomes active, the method may include, at 205, transmitting an indication that the multicast session is active to the core network node.

Figure 2B:
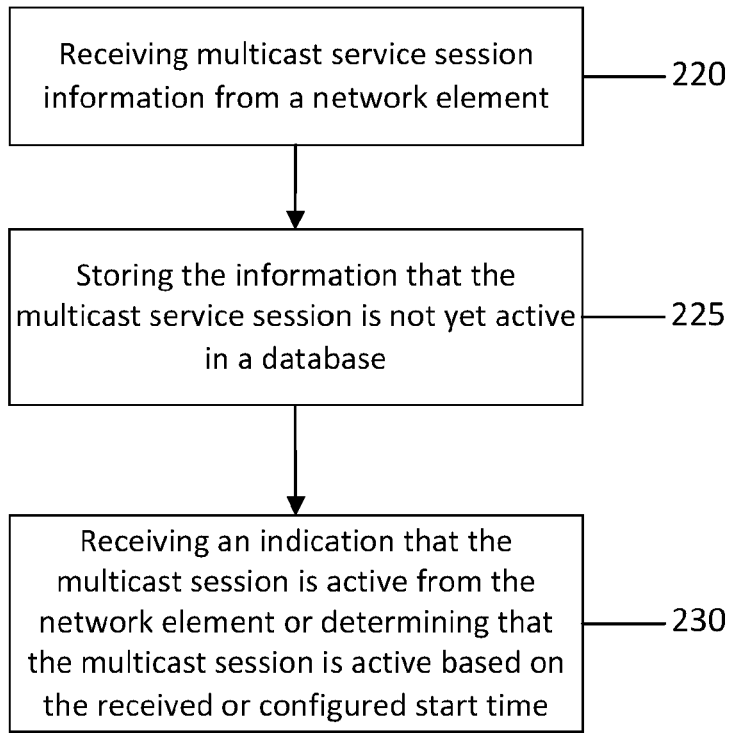
FIG. 2b illustrates an example flow diagram of a method, according to an embodiment.

FIG. 2b illustrates an example flow chart of a method for indicating separate session start request, according to an embodiment. In certain example embodiments, the flow diagram of FIG. 2b may be performed by a network entity or network node in a communications system, such as LTE or 5G NR. In some example embodiments, the network entity performing the method of FIG. 2b may include a base station, access node, node B, eNB, gNB, NG RAN node, or the like. For instance, in one example embodiment, the method of FIG. 2b may be performed by a NEF, such as the NEF depicted in the example diagram of FIG. 1.

As illustrated in the example of FIG. 2b, at 220, receiving multicast service session information from a network element, such as an AF or content provider. In an embodiment, the multicast service session information may include or contain an indication of whether a separate session start request will be later provided for the multicast service session. According to one embodiment, the method may include, at 225, storing the information that the multicast service session is not yet active in a database, such as a UDR. According to one example embodiment, the multicast service session information may also include or contain a start time and stop time for the multicast service session. Additionally or alternatively, the NEF may be configured with the start time and stop time for the multicast service session. In an embodiment, the method may include using the received or configured start time to determine when the multicast session becomes active. In certain embodiments, when the multicast service session becomes active, the method may include, at 230, receiving an indication that the multicast session is active from the network element (e.g., AF) or determining that the multicast session is active based on the received or configured start time.

Figure 2C:
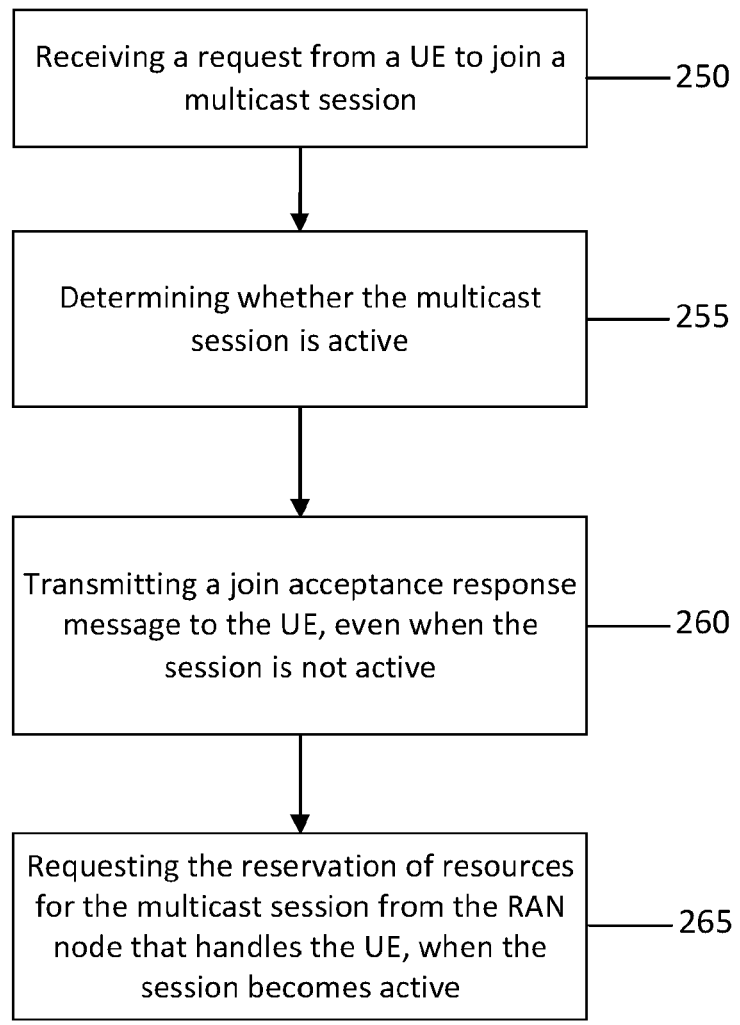
FIG. 2c illustrates an example flow diagram of a method, according to an embodiment.

FIG. 2c illustrates an example flow chart of a method for indicating separate session start request, according to an embodiment. In certain example embodiments, the flow diagram of FIG. 2c may be performed by a network entity or network node in a communications system, such as LTE or 5G NR. In some example embodiments, the network entity performing the method of FIG. 2c may include a base station, access node, node B, eNB, gNB, NG RAN node, or the like. For instance, in one example embodiment, the method of FIG. 2c may be performed by a core network node, such as the AMF or SMF depicted in the example diagram of FIG. 1.

As illustrated in the example of FIG. 2c, at 250, receiving a request from a UE to join a multicast session and, at 255, determining whether the multicast session is active. In an embodiment, when it is determined that multicast session is not active, the method may include, at 260, transmitting a join acceptance response message to the UE. According to an embodiment, the join acceptance response message may include an indication that the multicast session is not yet active and not requesting a RAN node handling the UE to reserve resources. When the multicast session becomes active (e.g., when the AMF or SMF are informed or determine that the multicast session is active), the method may include, at 265, requesting the reservation of resources for the multicast session from the RAN node that handles the UE. In an embodiment, if the UE is in IDLE state, the method may include paging the UE so that the UE transitions to connected state.

Figure 2D:
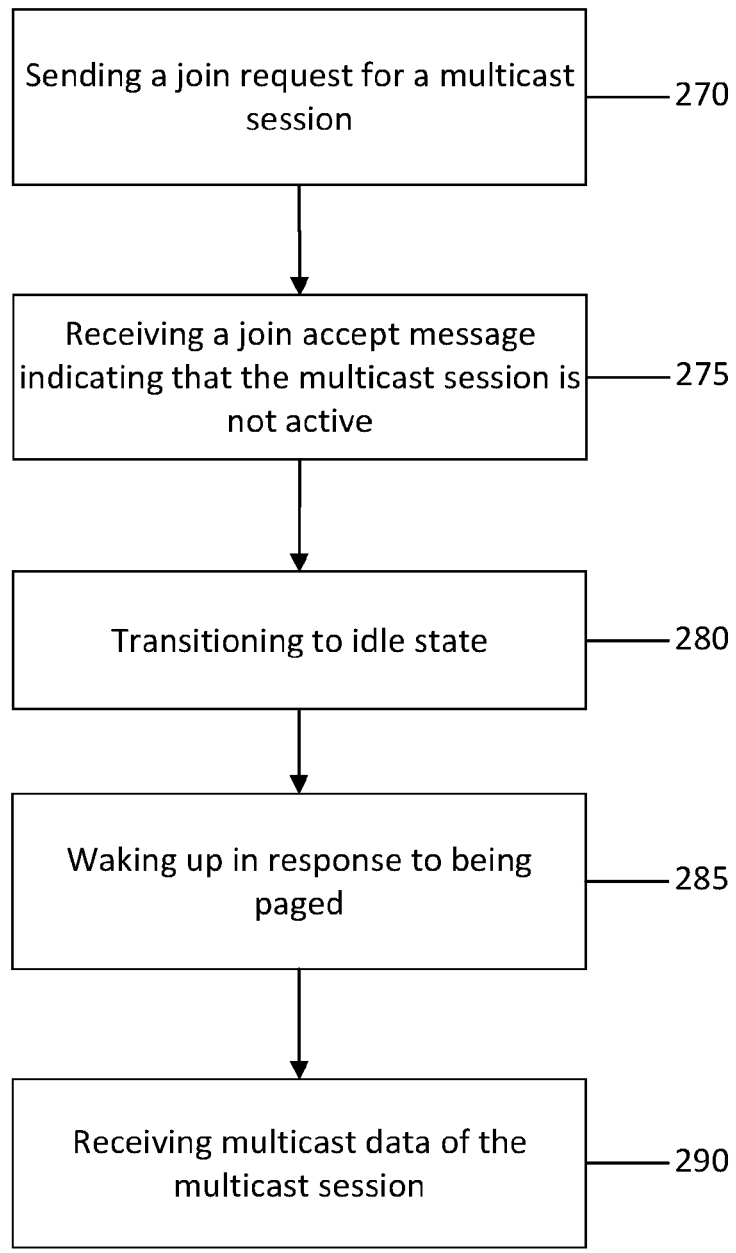
FIG. 2d illustrates an example flow diagram of a method, according to an embodiment.

FIG. 2d illustrates an example flow chart of a method for joining a not yet active multicast session, according to one example embodiment. In certain example embodiments, the flow diagram of FIG. 2d may be performed by a network entity or network node in a communications system, such as LTE or 5G NR. In some example embodiments, the network entity performing the method of FIG. 2d may include a user equipment, mobile station, mobile device, IoT device or the like, such as the UE as depicted in the example diagram of FIG. 1.

As illustrated in the example of FIG. 2d, the method may include, at 270, sending a join request for a multicast session and, at 275, receiving a join accept message with an indication that the multicast session is not active. Based on that indication that the multicast is not yet active, if the UE does not send or receive data unrelated to the multicast session for a certain duration, the method may include, at 280, transitioning to IDLE mode to save power. In an embodiment, the method may include, at 285, waking up when being paged. As a result, the UE is then listening to receive information about the radio resources used to transmit the multicast data of the multicast session and, at 290, the method may include subsequently receiving multicast data of the multicast session within those radio resources.

FIG. 3a illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 10 may be NG-RAN node, an eNB in LTE, or gNB in 5G. According to an embodiment, apparatus 10 may include or may represent an AF or content provider as discussed elsewhere herein and illustrated in the example of FIG. 1.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 3a.

As illustrated in the example of FIG. 3a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 3a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources. In certain examples, processor 12 may be configured as a processing means or controlling means for executing any of the procedures described herein.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein. In certain example embodiments, memory 14 may be configured as a storing means for storing any information or instructions for execution as discussed elsewhere herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. In certain example embodiments, transceiver 18 may be configured as a transceiving means for transmitting or receiving information as discussed elsewhere herein. Additionally or alternatively, in some embodiments, apparatus 10 may include an input and/or output device (I/O device) or means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. For example, in some embodiments, apparatus 10 may be configured to perform one or more of the processes depicted in any of the flow charts or signaling diagrams described herein. For instance, in one embodiment, apparatus 10 may be configured to perform at least the flow diagram illustrated in the example of FIG. 2a. In some embodiments, as discussed herein, apparatus 10 may be configured to perform a procedure relating to indicating separate session start request, for instance.

In an embodiment, apparatus 10 may be controlled by memory 14 and processor 12 to transmit multicast service session information to a core network node, such as a NEF. In an embodiment, the multicast service session information may include or contain an indication of whether a separate session start request will be later provided for the multicast service session. According to one example embodiment, the multicast service session information may also include or contain a start time and stop time for the multicast service session. In certain embodiments, when the multicast service session becomes active, apparatus 10 may be controlled by memory 14 and processor 12 to transmit an indication that the multicast session is active to the core network node.

FIG. 3b illustrates an example of an apparatus 20 according to another embodiment. In an embodiment, apparatus 20 may be a node, host, or server in a communications network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 20 may be NG-RAN node, an eNB in LTE, or gNB in 5G. According to an embodiment, apparatus 20 may include or may represent a core network node, such as a NEF, SMF and/or AMF, as discussed elsewhere herein and illustrated in the example of FIG. 1.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 3b.

As illustrated in the example of FIG. 3b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 3b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 or apparatus 30 via a wireless or wired communications link or interface 70 according to any radio access technology, such as NR.

According to some embodiments, processor 22 and memory 24 may be included in or may form a part of processing circuitry/means or control circuitry/means. In addition, in some embodiments, transceiver 28 may be included in or may form a part of transceiving circuitry or transceiving means.

As discussed above, according to some embodiments, apparatus 20 may be or may include a network nod or RAN node, such as a satellite, base station, NG-RAN node, a Node B, an evolved Node B (eNB), 5G Node B or access point, next generation Node B (NG-NB or gNB), and/or WLAN access point, associated with a radio access network, such as a LTE network, 5G or NR. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIG. 1, 2b or 2c. In certain embodiments, apparatus 20 may include or represent a core network node, such as a NEF, SMF and/or AMF, for example. According to an embodiment, apparatus 20 may be configured to perform a procedure relating to indicating separate session start request, for instance.

In certain embodiments, apparatus 20 may be controlled by memory 24 and processor 22 to receive multicast service session information from a network element, such as an AF or content provider. In an embodiment, the multicast service session information may include or contain an indication of whether a separate session start request will be later provided for the multicast service session. According to one embodiment, apparatus 20 may be controlled by memory 24 and processor 22 to store the information that the multicast service session is not yet active in a database, such as a UDR. According to one example embodiment, the multicast service session information may also include or contain a start time and stop time for the multicast service session. Additionally or alternatively, the apparatus 20 may be preconfigured with the start time and stop time for the multicast service session. In an embodiment, apparatus 20 may be controlled by memory 24 and processor 22 to use the received or configured start time to determine when the multicast session becomes active. In certain embodiments, when the multicast service session becomes active, apparatus 20 may be controlled by memory 24 and processor 22 to receive an indication that the multicast session is active to the core network node or to determine that the multicast session is active based on the received or configured start time.

According to a further embodiment, apparatus 20 may be controlled by memory 24 and processor 22 to receive a request from a UE to join a multicast session and to determine whether the multicast session is active. In an embodiment, when it is determined that multicast session is not active, apparatus 20 may be controlled by memory 24 and processor 22 to transmit a join acceptance response message to the UE. According to an embodiment, the join acceptance response message may include an indication that the multicast session is not yet active and not yet requesting a RAN node handling the UE to reserve resources. When the multicast session becomes active (e.g., when the apparatus 20 is informed or determines that the multicast session is active), apparatus 20 may be controlled by memory 24 and processor 22 to request the reservation of resources for the multicast session from the RAN node that handles the UE. In an embodiment, if the UE is in IDLE state, apparatus 20 may be controlled by memory 24 and processor 22 to page the UE so that the UE transitions to connected state.

FIG. 3c illustrates an example of an apparatus 30 according to another example embodiment. In an example embodiment, apparatus 30 may be a node or element in a communications network or associated with such a network, such as a UE, mobile equipment (ME), mobile station, mobile device, stationary device, sensor, IoT device, TSN device, or other device. As described herein, UE may alternatively be referred to as, for example, a mobile station, mobile equipment, mobile unit, mobile device, user device, subscriber station, wireless terminal, tablet, smart phone, IoT device or NB-IoT device, a connected car or vehicle, or other connected device, or the like. As one example, apparatus 30 may be implemented in, for instance, a wireless handheld device, a wireless plug-in accessory, or the like.

In some example embodiments, apparatus 30 may include one or more processors, one or more computer-readable storage medium (for example, memory, storage, or the like), one or more radio access components (for example, a modem, a transceiver, or the like), and/or a user interface. In some example embodiments, apparatus 30 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 30 may include components or features not shown in FIG. 3c.

As illustrated in the example of FIG. 3c, apparatus 30 may include or be coupled to a processor 32 for processing information and executing instructions or operations. Processor 32 may be any type of general or specific purpose processor. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 32 is shown in FIG. 3c, multiple processors may be utilized according to other example embodiments. For example, it should be understood that, in certain example embodiments, apparatus 30 may include two or more processors that may form a multiprocessor system (e.g., in this case processor 32 may represent a multiprocessor) that may support multiprocessing. In certain example embodiments, the multiprocessor system may be tightly coupled or loosely coupled (e.g., to form a computer cluster).

Processor 32 may perform functions associated with the operation of apparatus 30 including, as some examples, precoding of antenna gain/phase parameters, encoding and decoding of individual bits forming a communication message, formatting of information, and overall control of the apparatus 30, including processes related to management of communication resources.

Apparatus 30 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 34 can be comprised of any combination of random access memory (RAM), read only memory (ROM), static storage such as a magnetic or optical disk, hard disk drive (HDD), or any other type of non-transitory machine or computer readable media. The instructions stored in memory 34 may include program instructions or computer program code that, when executed by processor 32, enable the apparatus 30 to perform tasks as described herein.

In an example embodiment, apparatus 30 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 32 and/or apparatus 30.

In some example embodiments, apparatus 30 may also include or be coupled to one or more antennas 35 for receiving a downlink signal and for transmitting via an uplink from apparatus 30. Apparatus 30 may further include a transceiver 38 configured to transmit and receive information. The transceiver 38 may also include a radio interface (e.g., a modem) coupled to the antenna 35. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 38 may be configured to modulate information on to a carrier waveform for transmission by the antenna(s) 35 and demodulate information received via the antenna(s) 35 for further processing by other elements of apparatus 30. In other example embodiments, transceiver 38 may be capable of transmitting and receiving signals or data directly. Additionally or alternatively, in some example embodiments, apparatus 30 may include an input and/or output device (I/O device). In certain example embodiments, apparatus 30 may further include a user interface, such as a graphical user interface or touchscreen.

In an example embodiment, memory 34 stores software modules that provide functionality when executed by processor 32. The modules may include, for example, an operating system that provides operating system functionality for apparatus 30. The memory may also store one or more functional modules, such as an application or program, to provide additional functionality for apparatus 30. The components of apparatus 30 may be implemented in hardware, or as any suitable combination of hardware and software. According to an example embodiment, apparatus 30 may optionally be configured to communicate with apparatus 10 via a wireless or wired communications link 71 and/or to communicate with apparatus 20 via a wireless or wired communications link 72, according to any radio access technology, such as NR.

According to some example embodiments, processor 32 and memory 34 may be included in or may form a part of processing means and/or processing circuitry or control means and/or control circuitry. In addition, in some example embodiments, transceiver 38 may be included in or may form a part of transceiving means and/or transceiving circuitry.

As discussed above, according to some example embodiments, apparatus 30 may be a UE, mobile device, mobile station, ME, sensor, IoT device, TSN device, NB-IoT device, and/or other connected device, for example. According to certain example embodiments, apparatus 30 may be controlled by memory 34 and processor 32 to perform the functions associated with example embodiments described herein. For instance, in some example embodiments, apparatus 30 may be configured to perform one or more of the processes depicted in any of the diagrams or signaling flow diagrams described herein. As an example, apparatus 30 may correspond to or represent a UE, such as one or more of the UE(s) illustrated in the example of FIG. 1. According to certain example embodiments, apparatus 30 may be configured to perform a procedure relating to indicating separate session start request, for instance.

According to an example embodiment, apparatus 30 may be controlled by processor 32 and memory 34 to transmit a request to join a multicast session. In an embodiment, apparatus 30 may be controlled by processor 32 and memory 34 to receive a join acceptance response message, which may indicate that the multicast session is not active. In an embodiment, if the multicast session is not active, apparatus 30 may be controlled by processor 32 and memory 34 to transition to IDLE state. According to an embodiment, when the multicast session becomes active, apparatus 30 may be controlled by processor 32 and memory 34 to receive paging from a RAN node, transition to connected state, and receive information, from the RAN node, about the corresponding radio resources for the multicast session. In an embodiment, apparatus 30 may also be controlled by processor 32 and memory 34 to receive multicast data for the multicast session.

Furthermore, it should be noted that an apparatus, according to certain example embodiments, may include means or functions for performing any of the procedures described herein. For example, such means may include processing means, controlling means, transceiving means, storage means, or the like.

Therefore, certain example embodiments provide several technological improvements, enhancements, and/or advantages over existing technological processes and constitute an improvement at least to the technological field of wireless network control and management. For example, as discussed in detail in the foregoing, certain example embodiments provide methods of indicating whether separate session start request is used. According to an example embodiment, when an AF provides multicast service session information to the core network, the AF may also include an indication whether the AF will (later) provide a separate session start request for the multicast session. If this indication is contained in the multicast session information, the core network knows that the session is not yet active but that it will become active at a later point in time. In an embodiment, the network may store this information about the session becoming later active in a database (e.g., in UDR). Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

What is claimed is:

1. A network comprising:
a first apparatus;
a second apparatus; and
a third apparatus;
wherein the first apparatus is an Application Function (AF), comprises at least one first processor and at least one first memory storing first instructions that, when executed by the at least one first processor, cause the first apparatus at least to perform:
  determining multicast service session information for a multicast service session, wherein the multicast service session information comprises a start time and a stop time for the multicast service session;
  transmitting the multicast service session information to the second apparatus, wherein the multicast service session information comprises an indication that a session start request will be later provided for the multicast service session; and
  transmitting, when the multicast service session becomes active, an indication that the multicast service session is active to the second apparatus;
wherein the second apparatus is a core network node, comprises at least one second processor and at least one second memory storing second instructions that, when executed by the at least one second processor, cause the second apparatus at least to perform:
  receiving a request to join the multicast service session from the third apparatus;
  determining whether the multicast service session is active;
  requesting, when the multicast service session becomes active, reservation of resources for the multicast service session;
  transmitting, when the determining determines that the multicast service session is not active, a join acceptance response message to the third apparatus, wherein the join acceptance response message comprises an indication that the multicast service session is not active;
  when the third apparatus is in idle state, requesting that the third apparatus is paged or paging the third apparatus so that the third apparatus transitions to connected state; and
  informing the third apparatus of the reserved resources for the multicast service session; and
wherein the third apparatus is a user equipment (UE), comprises at least one third processor and at least one third memory storing third instructions that, when executed by the at least one third processor, cause the third apparatus at least to perform:

sending the request to join the multicast service session;
receiving the join acceptance response message comprising the indication that the multicast service session is not active;
based on the indication that the multicast service session is not active, and in an instance that the apparatus does not send or receive data unrelated to the multicast service session for a certain duration, transitioning to an idle mode;
waking up based on being paged; and
listening to receive information about radio resources used to transmit multicast data of the multicast service session.

2. The network of claim 1, wherein the second apparatus is further configured to, upon determining that the multicast session is not active, store information related to the join request from the third apparatus for subsequent processing when the multicast service session becomes active.

3. The network of claim 2, wherein the join acceptance response message transmitted by the second apparatus includes an estimated time until the multicast service session becomes active.

4. The network of claim 3, wherein the third apparatus is further configured to receive a join acceptance response message indicating that the multicast service session is not active, and transition to an idle state to conserve power until the multicast service session becomes active.

5. The network of claim 4, wherein the multicast service session information transmitted by the first apparatus includes an identifier of multicast content to be delivered during the multicast session.

6. The network of claim 5, wherein the second apparatus is further configured to maintain a list of user equipment that have requested to join the multicast session while it was inactive, and upon activation of the multicast session, transmit notifications to each user equipment on the list of user equipment that have requested to join the multicast session while it was inactive.

7. The network of claim 6, wherein the third apparatus further configured to receive the notification that the multicast service session is active, automatically transitions from the idle state to an active state to receive multicast data.

8. The network of claim 7, wherein the first apparatus is further configured to update the multicast session information to reflect changes in the start time and transmit the updated information to the second apparatus.

9. The network of claim 7, wherein the second apparatus is further configured to receive updated multicast session information indicating a change in the start time and transmit updated notifications to the third apparatus to reflect the new schedule.

10. The network of claim 9, wherein the second apparatus is further configured to:
receive, from the AF, the multicast service session information associated with a multicast session, wherein the multicast service session information includes an indication that a separate session start request will be provided at a later time;
store, prior to activation of the multicast session, the multicast service session information including the indication that the session is not yet active;
receive, a request from the third apparatus to join the multicast session prior to activation of the session; and
in response to the request from the third apparatus, conditionally accepting the join request without initiating radio resource allocation for the multicast session.

11. The network of claim 10, wherein conditionally accepting comprises the second apparatus acknowledging and recording the request to join a multicast session by the third apparatus prior to activation of the multicast service session, without allocating radio or session resources to the multicast session.

12. The network of claim 11, wherein the conditional acceptance enables the network to defer resource reservation and session establishment until a later trigger comprising one of the following: a receipt of a separate session start request; or an occurrence of a configured session start time.

* * * * *